(12) United States Patent
Merkler et al.

(10) Patent No.: US 6,729,442 B2
(45) Date of Patent: May 4, 2004

(54) WHEEL HUB MAGNETIC FILTER FOR LUBRICATING FLUIDS

(76) Inventors: Michael B. Merkler, 10211 Lake Sebago Dr., Fort Wayne, IN (US) 46804; Vincent O. Valenzuela, 102 W. 79th St., Apt. 2A, New York, NY (US) 10024; Daniel A. Grohnke, 1630 Florida Dr., Fort Wayne, IN (US) 46805; Richard L. Overman, 1719 Woodland Lake Pass, Fort Wayne, IN (US) 46825

(*) Notice: Subject to any disclaimer, the term of this patent is extended or adjusted under 35 U.S.C. 154(b) by 184 days.

(21) Appl. No.: 10/180,644

(22) Filed: Jun. 26, 2002

(65) Prior Publication Data

US 2004/0000451 A1 Jan. 1, 2004

(51) Int. Cl.[7] ............................................. F01M 11/08
(52) U.S. Cl. ...................................... 184/6.25; 384/389
(58) Field of Search ............................. 184/6.25, 6.21, 184/6.24; 384/375, 376, 389, 392

(56) References Cited

U.S. PATENT DOCUMENTS

| 3,800,914 | A | * | 4/1974 | Miyata ...................... 184/6.25 |
| 3,847,249 | A |   | 11/1974 | Oehring |
| 5,149,422 | A | * | 9/1992 | Barrington .................... 210/85 |
| 5,354,462 | A | * | 10/1994 | Perritt ........................ 210/223 |
| 5,811,000 | A |   | 9/1998 | Schäfer et al. |
| 6,270,667 | B1 |  | 8/2001 | Nakamura |
| 2003/0137375 | A1 | * | 7/2003 | Brunsting ................... 335/207 |

* cited by examiner

Primary Examiner—David Fenstermacher
(74) Attorney, Agent, or Firm—Jeffrey P. Calfa; Dennis Kelly Sullivan; Susan L. Lukasik

(57) ABSTRACT

A wheel hub magnetic filter fits within a wheel hub mounted for rotation on an end of the axle. The lubricating oil filter is positioned in a lubricating oil path upstream from the wheel hub bearings and is mounted with the wheel hub for rotation. The lubricating oil filter comprising a circular ring section which fits into an annular plenum in the wheel hub and includes flow directing barriers positioned radially inwardly from an outer edge of the circular ring section.

11 Claims, 9 Drawing Sheets

US 6,729,442 B2

WHEEL HUB MAGNETIC FILTER FOR LUBRICATING FLUIDS

BACKGROUND OF THE INVENTION

1. Field of the Invention

The present invention relates to an apparatus for filtering metallic shavings from liquid lubricant in an axle, and more particularly to lubricant circulating through the wheel hubs mounted on at the axle ends.

2. Description of the Problem

Rear drive axles for motor vehicles provide lubrication for moving parts within the axle, including the power distribution gears (the differential) and the bearings located in the axle ends for the wheel hubs. Lubricating oil circulates outwardly from the differential housing through the axle to the wheel hubs and returns by the same channel in the axle to the differential housing during cornering. During vehicle operation metal shavings may form off the differential gears and become suspended in the lubricating oil due to the continuing agitation of the differential ring gear. These metallic shavings can circulate to and through the wheel hubs, causing damage to or wear of the roller bearings located there through abrasion. The shavings may foul the bearings reducing the flow of lubricant, accelerating these negative effects.

Filtration of metallic shavings in the differential housing to protect the differential is known in the art. For example, U.S. Pat. No. 3,847,249 to Oehring teaches providing a lubricant filtration system located in the differential housing. The filtration system was simple to construct, easy to service and reliable in operation, requiring only infrequent service. During vehicle operation oil is splashed against the interior of the differential housing by action of the differential gears. Oehring provides a filter comprising a lubricant receptacle positioned between the periphery of the large differential ring gear and the top of the differential housing to collect oil dripping from the interior housing surface. The filter unit provides a relatively large area for lubricant flow, a large area for filtered lubricant distribution, and a particle collection cavity in which separated solid particles can accumulate without adversely affecting the filtration function by filter media blockage. In one form, mechanical filtration was supplemented by magnetic separation of metallic particles from the lubricant. Such a filtration system provides no guarantee of thorough filtering of the oil, and the rate of exchange between oil in the wheel hubs and the differential housing may be very slow, with the consequence that oil reaching the wheel hubs may not be filtered. This can allow metal bearing oil to reach the hubs with the consequential risk of damage to the wheel bearings.

SUMMARY OF THE INVENTION

According to the invention there is provided a magnetic filter for installation in a wheel hub. The magnetic filter fits within the wheel hubs, which are mounted for rotation on each end of the axle. The wheel hub rotates on a plurality wheel hub bearings disposed on the end of the axle in contact with the wheel hub. The axle includes a channel allowing lubricating oil to reach the wheel hub bearings. The lubricating oil filter is positioned in the lubricating oil path between the wheel hub bearings and the channel, so that all oil reaching the bearings passes through the hub, and is mounted with the wheel hub for rotation. The lubricating oil filter comprises a circular ring section which fits into an annular plenum in the wheel hub and includes flow directing barriers positioned radially inwardly from an outer edge of the circular ring section. Centripetal acceleration will promote separation of the more massive metal shavings from the lubricating oil. Constructing the ring of a magnetic material promotes retention of the metal shavings on the ring. Construction of the ring from a spring material, and the provision of gaps or holes through the filter, allow fitting the ring into the plenum without fasteners.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
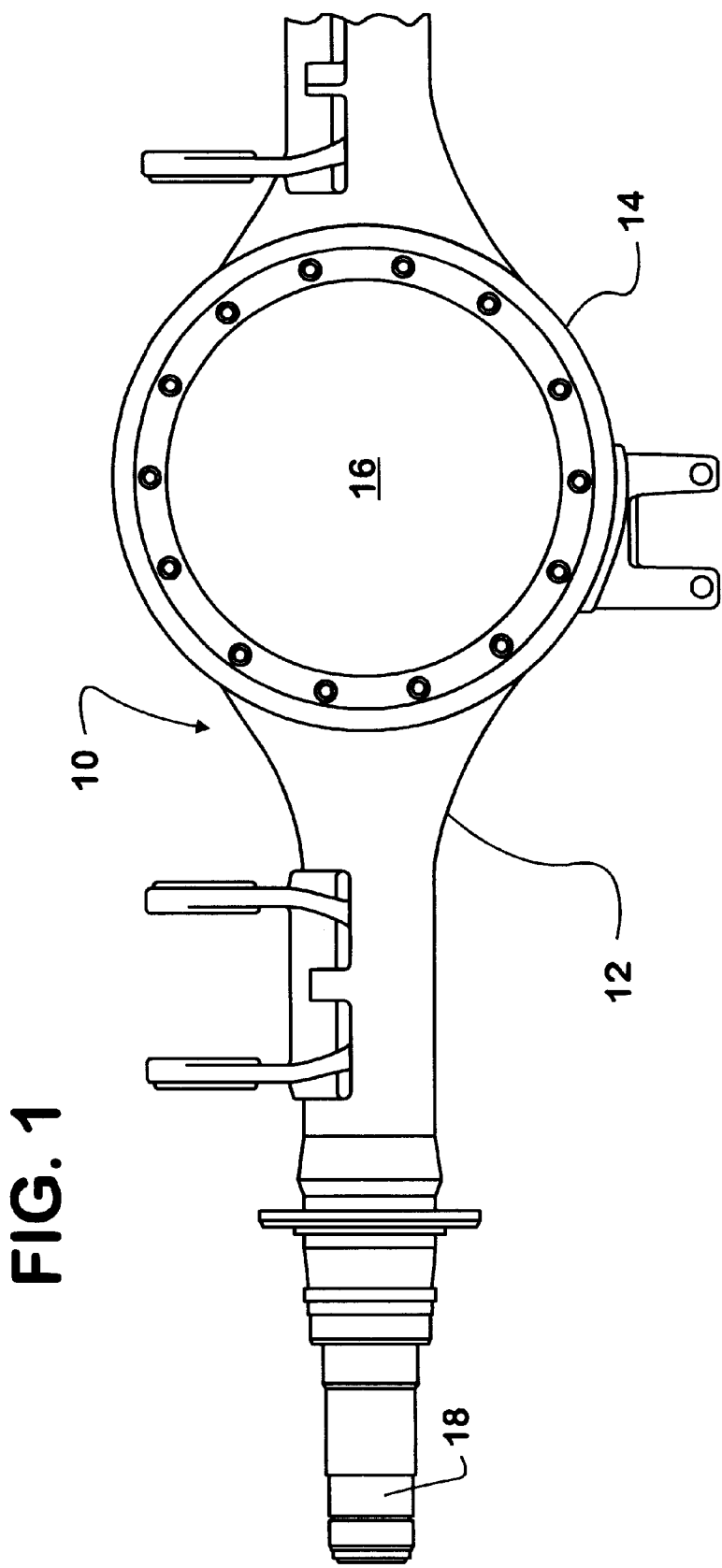
FIG. 1 is a top view of a vehicle drive axle.

Referring now to the figures and in particular to FIG. 1, a vehicle drive axle assembly 10 of a general type is illustrated. Axle assembly 10 includes an elongated housing 12 and a central expanded enclosure 14, which contains a drive differential. The drive differential may be reached by removal of a differential cover plate 16. Each end 18 (only one shown) of axle housing 12 supports a wheel hub as illustrated below.

Figure 2:
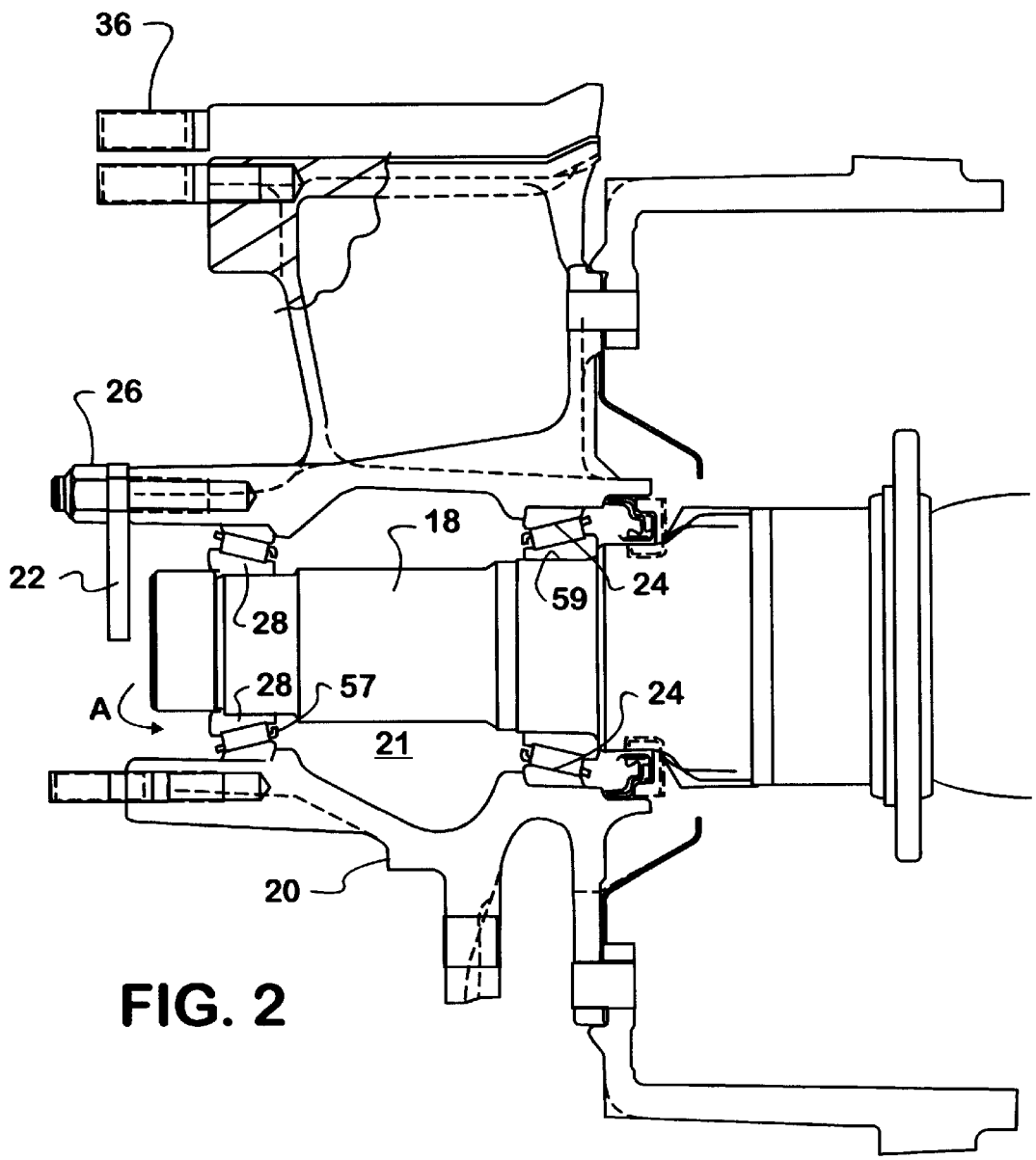
FIG. 2 is a view in partial section of an end of a drive axle for a vehicle.

FIG. 2 illustrates mounting of a wheel hub 20 on an axle end section 18. Wheel hub 20 rotates on axle end section 18 supported by outer roller bearings 28 and inner roller bearings 24. Bearings 28 and 24 contact lubricating oil supplied from the differential at the bottom of a bearing race. Lubricating oil from the differential is supplied through the axle housing out of end 20 to the wheel bearings in the direction indicated by arrow A. During turns where axle end 20 is to the outside of the turn additional oil will flow out of the axle and into plenum 21 including bearings 28 and 24. Turns in the opposite direction reverse the direction of oil flow. An inner ring of bolts 26 secure attachment of wheel hub 20 to support the mounting of wheels to the hub.

Figure 3:
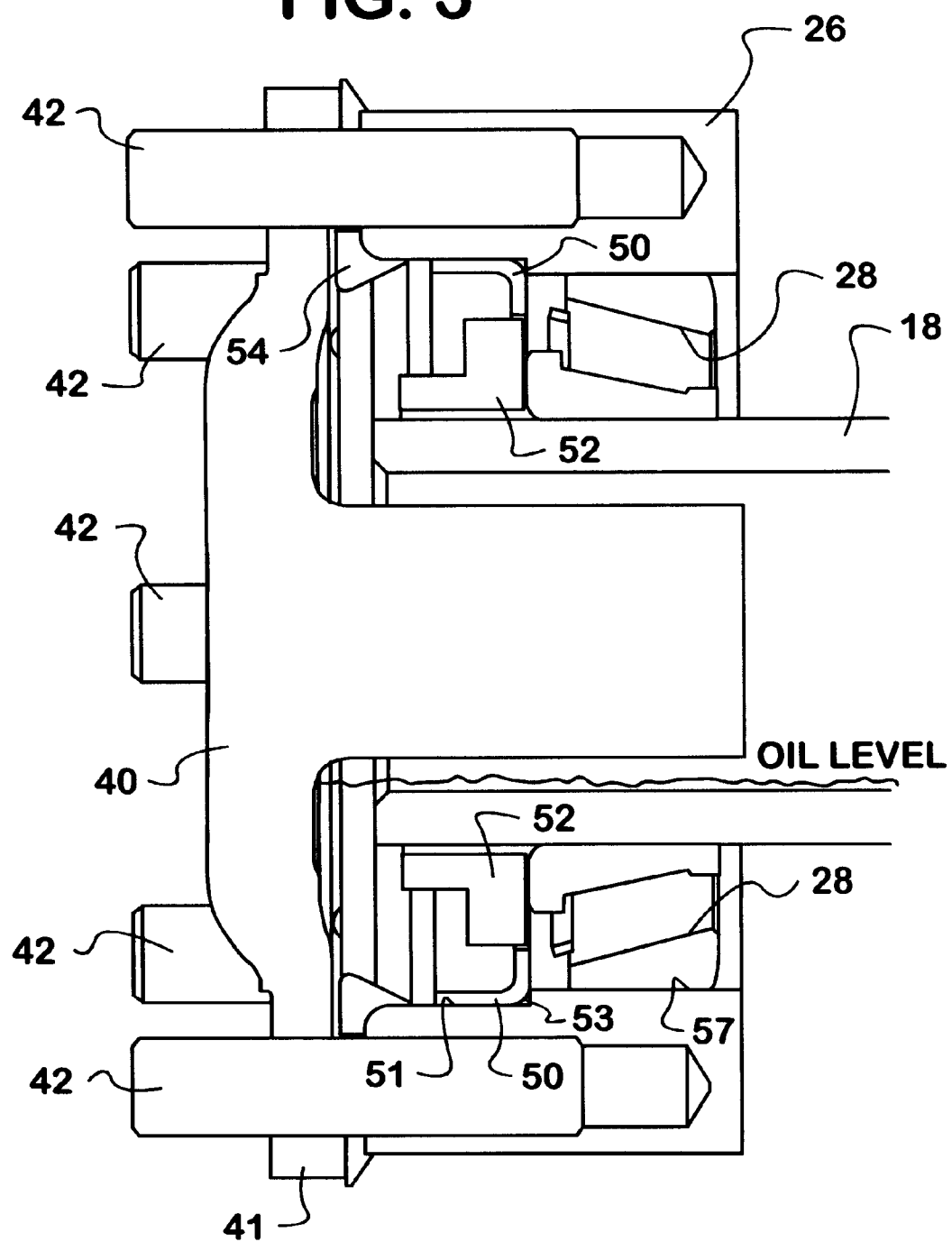
FIG. 3 is a view in section of a wheel hub.

Referring now to FIG. 3, wheel hub 26 is mounted around axle end 18, on which it is supported by bearings 28, attached to powered axle shaft 40 by a plurality of mounting studs 42. A magnetic filter ring 50 having an "L" shaped cross sectional area is illustrated positioned inside an annular opening 51 in a wheel hub 26, just outside of a plurality of wheel bearing adjusting nuts 52 and backed up against a shoulder 53. Outer bearing 28 is positioned in an annular plenum inside of the shoulder 53. Axle shaft 40 ends in a flattened disk section 41 which is sealed against hub 26 along a ring seal 54. The lubricating oil level inside of shaft end 18, supplied from the differential, assures that a portion bearing 28 is submerged in the oil. As bearings 28 move through the oil the are coated with a layer of lubrication. Lubricating oil may circulate through the axle as a result of turns with the differential acting as a sort of pump to mix the oil. Bearings 28 and 24 are located in races 57 and 59 in a dead end plenum, so that the positioning of filter 50 forces any oil which reaches the bearings to pass through filter.

Magnetic ring filter 50 rotates with wheel hub 26, resulting in greater force from centripetal acceleration being applied to the denser particles suspended in the lubricating oil then to the oil, driving them toward the outer portion of the ring, where, if they a ferro-metallic, they adhere due to the magnetic properties of the ring. The inner portion of ring 50 includes openings which allow oil to pass in either direction.

Figure 4:
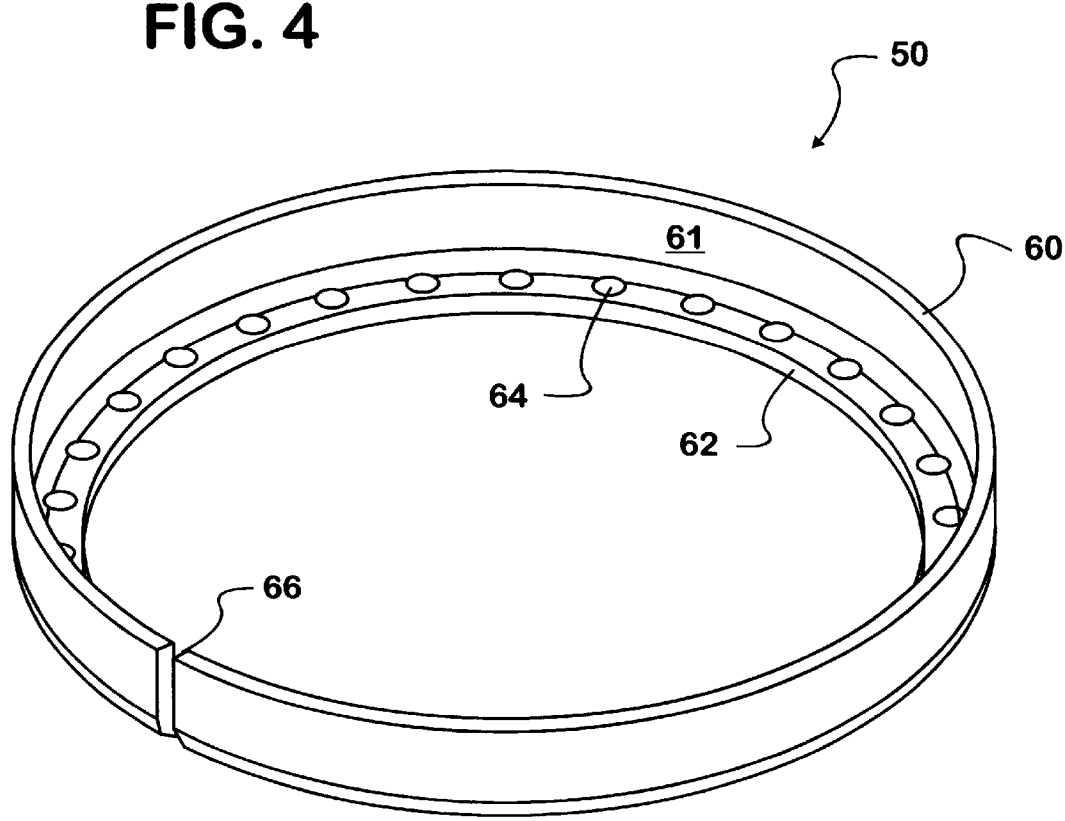
FIG. 4 is a perspective view of a magnetic ring filter according to a first preferred embodiment of the invention.
Figure 5:
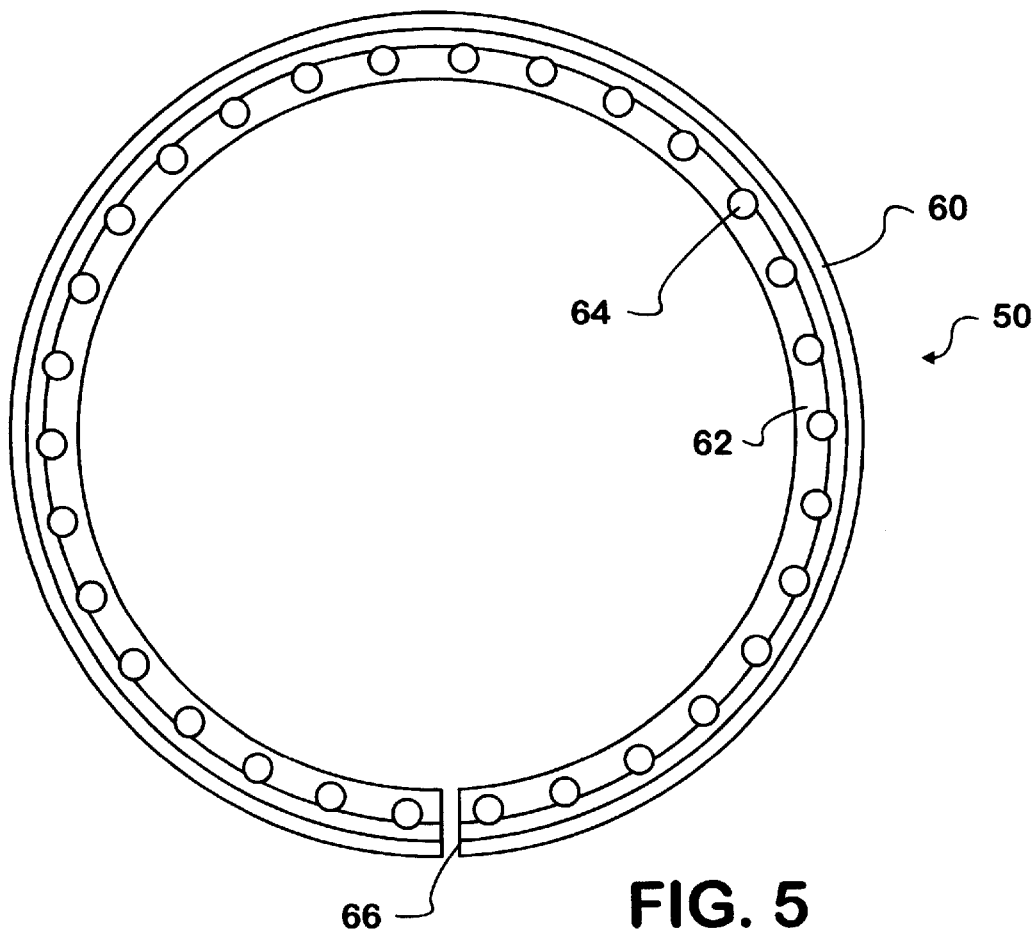
FIG. 5 is a top plan view of the magnetic ring filter of FIG. 4.
Figure 6:
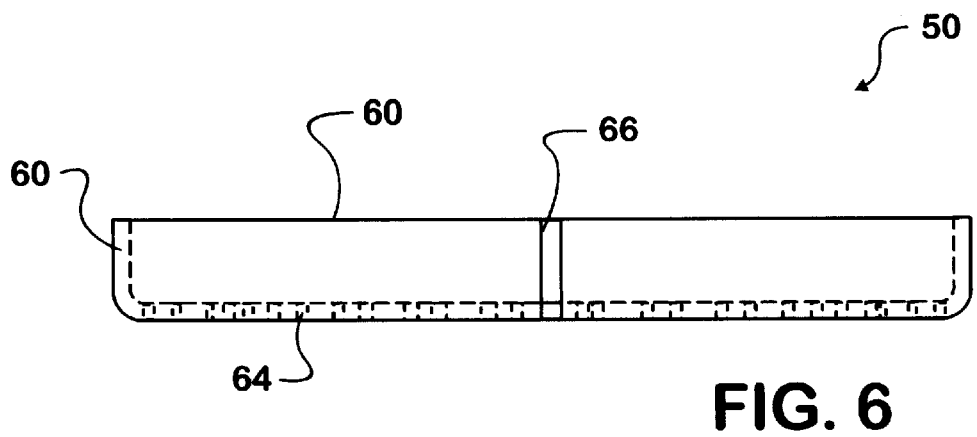
FIG. 6 is a side elevation of the magnetic ring filter of FIG. 4.

FIGS. 4–6 illustrate the magnetic filter ring 50 in detail from perspective, side elevation and top views. Ring 50 includes a solid outer section 60, the opposite major surfaces of which are parallel to a central axis of the ring. An inner major surface 61 of outer section 60 provides a surface to which metal shavings under magnetic attraction adhere. A second major portion of ring 50 is provided by an inner ring 62, which is perpendicular to outer section 60. Inner ring 62 is pierced by a plurality of holes 64 through which oil passes. Filter ring 50 is broken by a relatively narrow gap 66 aligned with the central axis through both the outer and inner major sections 60 and 62. Ring 50 is preferably made of a spring grade steel, and is slightly oversized when untensioned compared to the annular space into which it is intended to fit. Pressing ring 50 into a wheel hub compresses the spring, closing gap 66 as required, to fit into the intended space. Spring tension holds ring 50 holds in the annular space. Obviously then, ring 50 does not need fit the annular wheel hub opening perfectly. In some applications, gap 66 may be omitted and the holes through ring filter 50 compressed to achieve the desired fit.

Figure 7:
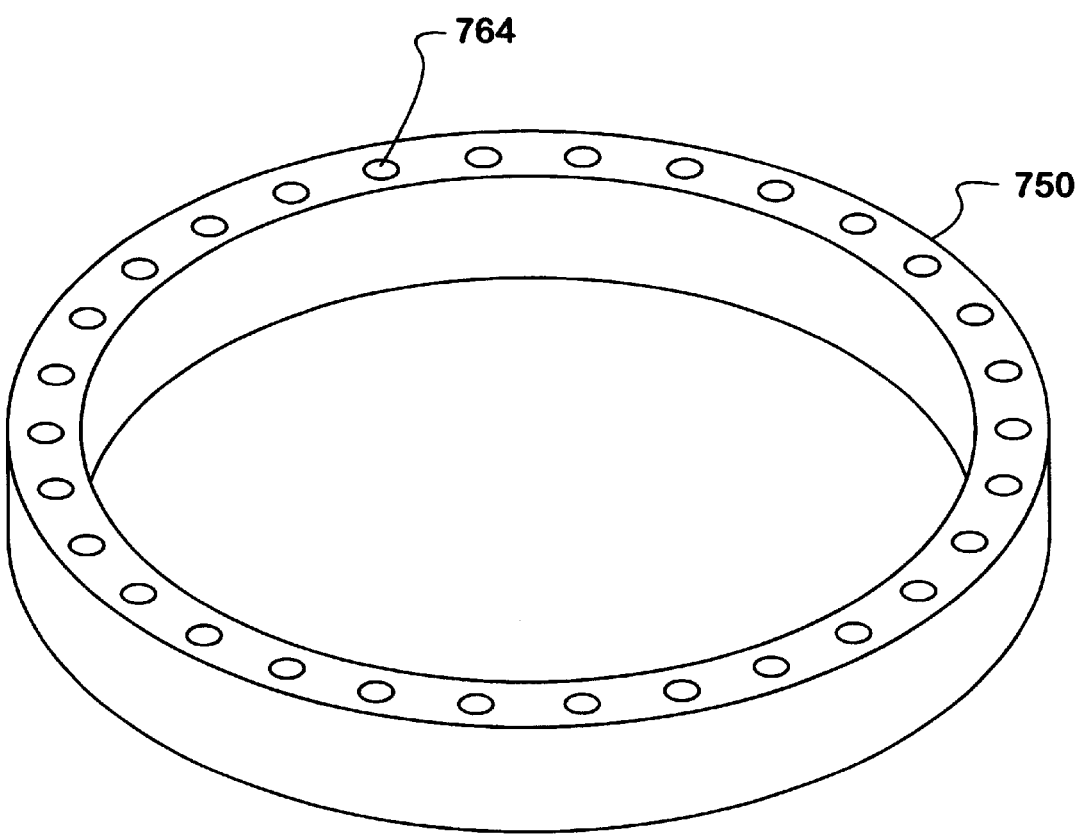
FIG. 7 is a perspective view of an alternative ring filter.
Figure 8:
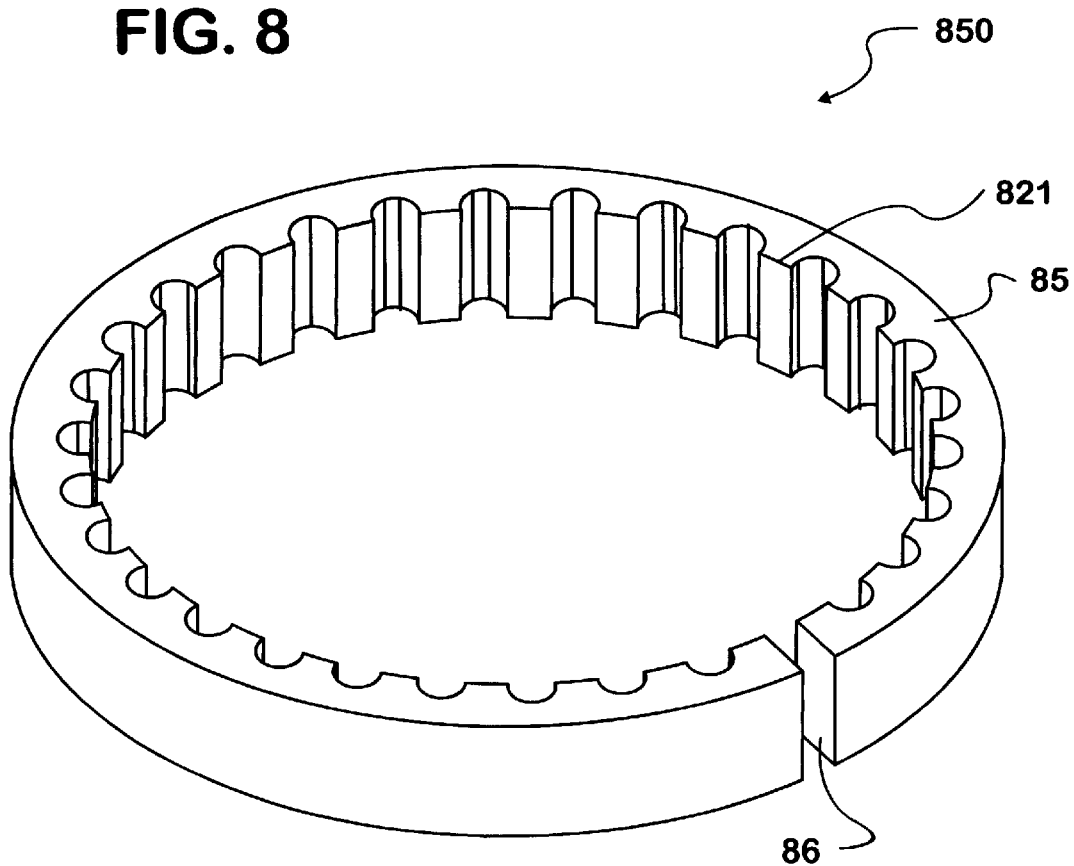
FIG. 8 is a perspective view of another ring filter.
Figure 9:
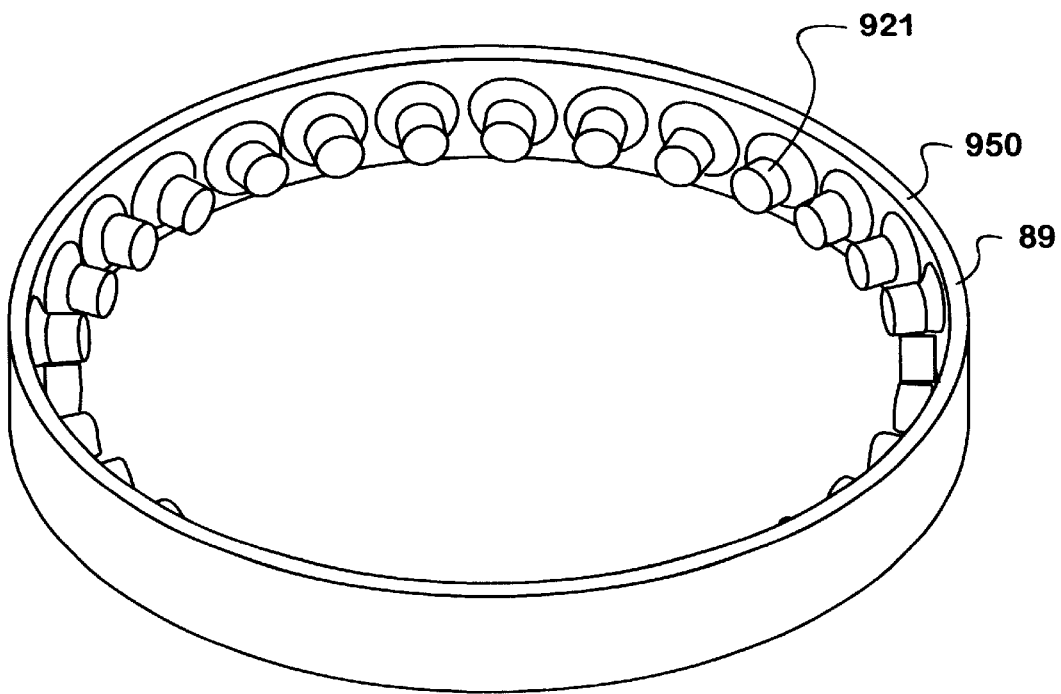
FIG. 9 is a perspective view of still another ring filter.

FIGS. 7–9 illustrate alternative configurations for magnetic filters. In FIG. 7 a ring filter 750 is formed as a ring having a rectangular cross section. A plurality of holes 764 pass the length of the ring, allowing oil to pass through the ring. No gap is illustrated in the ring, although one may be provided. Again the preferred material is ferromagnetic, allowing the material to be permanently magnetized to cause shavings from the differential to adhere to the upstream surface of the ring. In FIG. 8 a ring 850 is illustrated formed with inwardly oriented teeth 821 from an outer ring 85. A fitting gap 86 in the ring allows compression and generation of spring tension for fitting and retaining the ring 850 in an annular gap. FIG. 9 illustrates yet another possibility for a ring 950 based on an outer ring 89 and a plurality of inwardly oriented posts 921 for channeling and disrupting oil flow to allow centripetal acceleration to separate the shavings from the oil.

Figure 10:
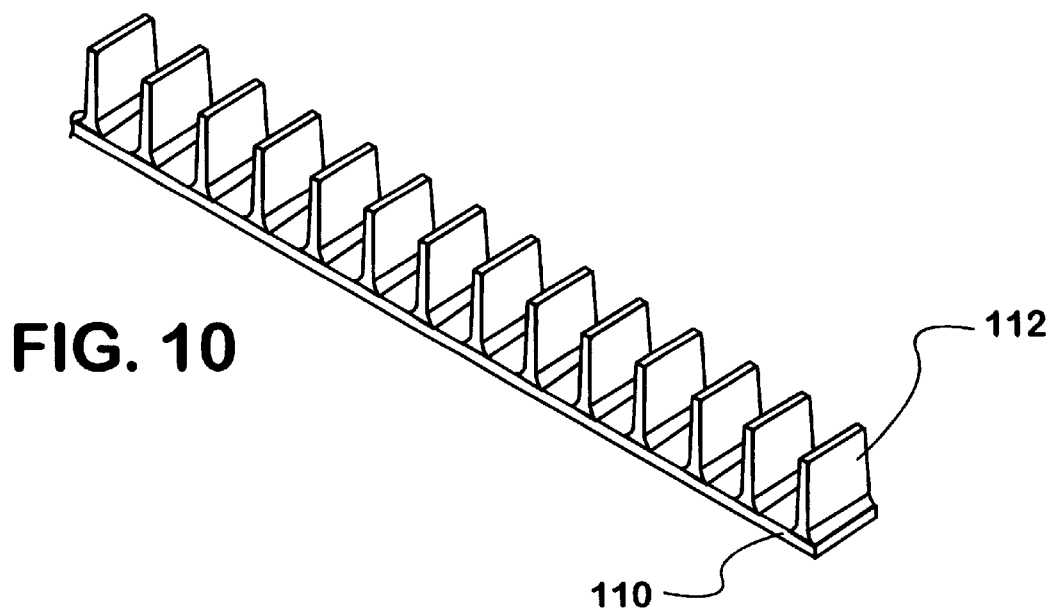
FIG. 10 is a perspective view of another filter.

An alternative magnetic filter is depicted in FIG. 10, where a strip 110 supports a plurality of upright vanes 112 on one major surface thereof. Strip 110 is flexible, allowing it to be coiled and inserted into an annular plenum. The major surface of strip 110 opposite the strip supporting the vanes 112 may be made tacky to retain it in place in a plenum. The material may be loaded with magnetic material to attract metallic shavings separating from the lubricating oil along vanes 112. The strip may be cut to the desired length for a given application.

The invention provides a simple, easily serviceable filter for wheel hubs. No tools are required for fitting the device and in its preferred embodiment may be made to retrofit to many existing wheel hubs. In a flexible tape form it is widely usable.

While the invention is shown in only one of its forms, it is not thus limited but is susceptible to various changes and modifications without departing from the spirit and scope of the invention.

What is claimed is:

1. A vehicle axle assembly comprising:
   an axle housing having two ends;
   wheel hubs installed on each of the two ends of the axle housing, the wheel hubs further comprising bearings supporting rotation of wheel hubs;
   a lubricant circulation path for distributing lubricant through the axle housing including around the bearings; and
   a filter fitted into the wheel hub across the lubricant circulation path for removing particles from the lubricant.

2. A vehicle axle assembly as set forth in claim 1, the filter further comprising a magnetic sections.

3. A vehicle axle assembly as set forth in claim 2, the filter further comprising a magnetic spring steel strip shaped as a ring having a gap.

4. A vehicle axle assembly as set forth in claim 3, the filter having an L shaped cross section with an inner section in the plane of the ring and an outer section shaped perpendicular to the inner section, the inner section further comprising a plurality of openings through the section allowing lubricant to pass through.

5. A vehicle axle assembly as set forth in claim 2, the filter comprising a flexible strip.

6. A vehicle axle assembly as set forth in claim 2, the filter comprising a ring with a plurality of radially inwardly oriented protrusions.

7. A vehicle axle assembly as set forth in claim 2, the filter comprising a ring with a rectangular cross section and a plurality of openings through the ring parallel to the central axis of the ring.

8. A vehicle axle assembly as set forth in claim 2, the filter comprising a ring with a plurality of blades inwardly oriented from an inner surface of the ring.

9. Apparatus comprising:
   an axle;
   a wheel hub mounted for rotation on an end of the axle;
   a plurality wheel hub bearings disposed in races at the end of the axle in contact with the wheel hub;
   a lubricating oil path from the axle into the wheel hub including a portion of the races;
   a lubricating oil filter mounted in the wheel hub for rotation and positioned across the lubricating oil path isolating the races from the rest of the lubricating oil path, the lubricating oil filter comprising a circular ring section and flow directing barriers positioned radially inwardly from an outer edge of the circular ring section.

10. Apparatus as set forth in claim 9, further comprising the lubricating oil filter being magnetic to attract metallic particles passing near.

11. Apparatus as set forth in claim 10, further comprising the circular ring section being fabricated from spring grade steel and including a gap allowing the circular ring section to snap fit into an annular plenum.

* * * * *